United States Patent [19]

Shibutani

[11] Patent Number: 4,972,515
[45] Date of Patent: Nov. 20, 1990

[54] POLARIZATION DIVERSITY RECEIVER HAVING LITTLE DETERIORATED SENSITIVITY DESPITE USE OF A SQUARE-LAW DEMODULATOR HAVING A RESTRICTED DYNAMIC RANGE

[75] Inventor: Makoto Shibutani, Tokyo, Japan

[73] Assignee: NEC Corporation, Tokyo, Japan

[21] Appl. No.: 354,558

[22] Filed: May 22, 1989

[30] Foreign Application Priority Data

May 20, 1988 [JP] Japan .................................. 63-123143

[51] Int. Cl.$^5$ .............................................. G02F 2/00
[52] U.S. Cl. ....................................... 455/619; 455/616
[58] Field of Search ..................... 455/619, 616; 370/2

[56] References Cited

FOREIGN PATENT DOCUMENTS 0165538 9/1984 Japan .................................... 455/619
0010937 1/1987 Japan .................................... 455/616

OTHER PUBLICATIONS

Dolato Smith, "Techniques for Multigigabit Coherent Optical Transmission", Journal of Lightwave Tech., vol. LT-5, No. 10, Oct. 1987, pp. 1466-1478.

*Primary Examiner*—Joseph A. Orsino
*Assistant Examiner*—Geoff Sutcliffe
*Attorney, Agent, or Firm*—Sughrue, Mion, Zinn, Macpeak & Seas

[57] ABSTRACT

In a polarization diversity receiver comprising demodulator circuits (31, 32) which may have a restricted dynamic range, input intermediate frequency signals are supplied from optical detectors (16, 17) to automatic gain controllers (21, 22) for producing output intermediate frequency signals with their intensities adjusted optimal to the respective demodulator circuits irrespective of a fluctuation which may appear in a polarization state of a signal beam supplied to the receiver. Supplied with the output intermediate frequency signals, the demodulator circuits deliver baseband signals to a signal combiner (43) with their intensities adjusted so as to have a ratio which is equal to a square of a ration between intensities of the input intermediate frequency signals. This makes the receiver have a reception sensitivity which is least deteriorated by polarization diversity. Each automatic gain controller comprises a variable gain adjuster (26, 28) which may be either feed forward or feedback controlled by a control signal produced by an intensity detector (25, 27). Each demodulator circuit comprises another variable gain adjuster (41, 42) controlled by the control signal.

3 Claims, 3 Drawing Sheets

POLARIZATION DIVERSITY RECEIVER HAVING LITTLE DETERIORATED SENSITIVITY DESPITE USE OF A SQUARE-LAW DEMODULATOR HAVING A RESTRICTED DYNAMIC RANGE

BACKGROUND OF THE INVENTION

This invention relates to a polarization diversity receiver for use in optical heterodyne detection communication.

Among various optical communication systems, an optical heterodyne detection system or coherent optical fiber transmission system is excellent in view of its high reception sensitivity. This fact is described in an article contributed by Y. Yamamoto and T. Kimura to the IEEE Journal of Quantum Electronics, Volume QE-17, No. 6 (June 1981), pages 919 to 935, under the title of "Coherent Optical Fiber Transmission Systems".

In an optical heterodyne receiver, a local oscillation beam is coupled to an incident optical beam supplied to the receiver through an optical fiber. In order to achieve the high reception sensitivity, the incident optical and the local oscillation beams must have a common polarization state. It should be noted in this connection that the polarization state of the incident optical beam is subject to an irregular fluctuation due to disturbances or turbulances which are inevitably caused on the optical beam in the optical fiber. The optical heterodyne receiver must therefore comprise a circuit which compensates for the irregular fluctuation in the polarization state of the incident optical beam.

For use as the optical heterodyne receiver, a polarization diversity receiver is desirable in compensating for the irregular fluctuation in the polarization state of the incident optical beam. In the manner known in the art, the polarization diversity receiver comprises a directional optical coupler for coupling the incident optical beam and the local oscillation beam into a coupled optical beam. A polarization beam splitter is used in splitting the coupled optical beam into first and second optical beams having planes of polarization which are orthogonal to each other. First and second optical detectors or photodetectors are used to convert the first and the second optical beams into first and second intermediate frequency signals.

In the polarization diversity receiver, a processor is used to carry out combination and demodulation of the first and the second intermediate frequency signals to produce a receiver output signal. In each of the first and the second optical beams, the incident optical and the local oscillation beams have components, each of which is a plane or linearly polarized beam and which have a common plane of polarization. No signal loss therefore appears due to incoincidence in the polarization state between the incident optical and the local oscillation beams.

The processor may first demodulate the first and the second intermediate frequency signals into first and second baseband signals and thereafter combine the first and the second baseband signals into the receiver output signal. When the processor is operable in this manner, the polarization diversity receiver will be said to be of a baseband combining type.

In the polarization diversity receiver of the baseband combining type, a supplying circuit is used in supplying the first and the second intermediate frequency signals to first and second demodulator circuits. According to prior art, the supplying circuit may consist of mere connections between the first and the second optical detectors and the first and the second demodulator circuits.

Each of the demodulator circuits is for carrying out square-law detection on a pertinent one of the first and the second intermediate frequency signals that is supplied to the demodulator circuit under consideration. A signal combiner is used in combining the first and the second baseband signals into the receiver output signal. The square-law detection may be either delay detection or square-law envelope detection.

In an article contributed by B. Glance to the Journal of Lightwave Technology, Volume LT-5, No. 2 (February 1987), pages 274 to 276, under the title of "Polarization Independent Coherent Optical Receiver", a bit error rate is calculated in connection with a polarization diversity receiver of the baseband combining type, in which differential phase shift keying (DPSK) is used as the delay detection. As a result of computer simulation, Glance shows that the polarization diversity deteriorates or degrades the reception sensitivity only 0.4 dB irrespective of the polarization state of the incident optical beam.

It should be noted that the above-described result of Glance is applicable to a polarization diversity receiver which is of the baseband combining type and comprises two ideal demodulator circuits. More particularly, each demodulator circuit should have a very wide dynamic range in order to keep the reception sensitivity excellent irrespective of the polarization state of the incident optical beam. It is, however, very difficult to realize a wide-dynamic-range demodulator circuit which is moreover operable in a broad frequency band used in the optical communication.

In practice, each of the demodulator circuits is operable in a restricted or limited dynamic range. This results in a sensitivity deterioration or degradation. In fact, it is described in a report contributed by B. Enning et al to the OFC '88 Technical Digest as Paper No. TU15 and under the title of "Polarization-diversity Receiver for 560-Mbit/s ASK Heterodyne Detection" that the sensitivity deterioration amounts to 1 dB in a polarization diversity receiver which is of the baseband combining type and comprises demodulator circuits having a restricted dynamic range.

Not only to the restricted dynamic range of the demodulator circuits, attention must be directed but also to the fact that the demodulator circuits comprise circuit elements having characteristics which may not necessarily be uniform. When the characteristics of a pair of corresponding circuit elements are not identical with each other in the two demodulator circuits, a fluctuation is unavoidable in the sensitivity deterioration. This adversely affects the reception sensitivity.

Incidentally, it may be mentioned here that frequency shift keying (FSK) single filter envelope detection is described in a letter contributed by K. Emura et al to the Electronics Letters, Volume 20, No. 24 (the 22nd Feb. 1984), pages 1022 and 1023, under the title of "Novel Optical FSK Heterodyne Single Filter Detection System Using a Directly Modulated DFB-Laser Diodes". Differential phase shift keying detection is discussed in a report contributed by K. Emura et al to the IOOC-ECOC '85 Technical Digest, pages 401 to 403, under the title of "400 Mb/s Optical DPSK Heterodyne Detection Experiments Using DBR Laser Diodes with External Optical Feedback".

It may furthermore be mentioned here that a balanced receiver structure can be used in place of a combination of the directional optical coupler, the polarization beam splitter, and the first and the second optical detectors. The balanced receiver structure is disclosed by the present inventor et al in U.S. patent application Ser. No. 291,885 filed Dec. 29, 1988 (European Patent Application No. 88 12 1791.3 filed the 28th Dec. 1988).

In the balanced receiver structure, the incident optical beam alone is split into first and second signal beams having orthogonal planes of polarization. The local oscillation beam is divided into first and second local beams. Two directional optical couplers are used in coupling the first signal beam and the first local beam into the first optical beam and the second signal beam and the second local beam into the second optical beam. Each of the optical detectors includes two optical detectors whose output signals are differentially combined into one of the first and the second intermediate frequency signals.

It is therefore possible to understand that a polarization diversity receiver comprises (1) a coupling and splitting arrangement for coupling and splitting an incident optical beam and a local oscillation beam to produce first and second optical beams including incident optical beam components which have orthogonal planes of polarization and (2) an optical detecting arrangement for detecting the first and the second optical beams to produce first and second intermediate frequency signals.

SUMMARY OF THE INVENTION

In view of the foregoing, it is an object of the present invention to provide a polarization diversity receiver which is of a baseband combining type and comprises square-law demodulator circuits having a restricted dynamic range and yet which has an excellent reception sensitivity.

It is another object of the instant invention to provide a polarization diversity receiver of the type described, for which polarization diversity little deteriorates the excellent reception sensitivity.

It is still another object of this invention to provide a polarization diversity receiver of the type described, which has the reception sensitivity little deteriorated by the restricted dynamic range of the demodulator circuits.

It is yet another object of this invention to provide a polarization diversity receiver of the type secribed, in which circuit elements of the demodulator circuits may have nonuniform characteristics and which has the reception sensitivity little deteriorated by the nonuniform characteristics.

Other objects of this invention will become clear as the description proceeds.

On describing the gist of this invention, it is possible to understand that a polarization diversity receiver comprises coupling and splitting means for coupling and splitting an incident optical beam and a local oscillation beam to produce first and second optical beams including incident optical beam components having orthogonal planes of polarization, optical detecting means for detecting the first and the second optical beams to produce first and second intermediate frequency signals, first and second demodulator circuits, supplying means for supplying the first and the second intermediate frequency signals to the first and the second demodulator circuits to make the first and the second demodulator circuits produce first and second baseband signals, respectively, and a signal combiner for combining the first and the second baseband signals into a receiver output signal.

According to this invention, the supplying means comprises: (a) first and second intensity detectors supplied with the first and the second intermediate frequency signals to detect intensities of the first and the second intermediate frequency signals and to produce first and second control signals, respectively, (b) a first variable gain adjuster connected to the first intensity detector for gain adjusting the first intermediate frequency signal in response to the first control signal to make the first intermediate frequency signal have a first optimum intensity; and (c) a second variable gain adjuster connected to the second intensity detector for gain adjusting the second intermediate frequency signal in response to the second control signal to make the second intermediate frequency signal have a second optimum intensity.

In the above-understood polarization diversity receiver, the first demodulator circuit comprises: (i) a first demodulator for demodulating the first intermediate frequency signal of the first optimum intensity into the first baseband signal; and (ii) a third variable gain adjuster connected to the first intensity detector for gain adjusting the first baseband signal in response to the first control signal to make the first baseband signal have a first baseband signal intensity. The second demodulator circuit comprises: (iii) a second demodulator for demodulating the second intermediate frequency signal of the second optimum intensity into the second baseband signal; and (iv) a fourth variable gain adjuster connected to the second intensity detector for gain adjusting the second baseband signal in response to the second control signal to make the second baseband signal have a second baseband signal intensity. The first and the second baseband signal intensities should have a ratio which is equal to a square of a ratio between intensities of the first and the second intermediate frequency signals supplied to the first and the second variable gain adjusters. The signal combiner is for combining the first baseband signal of the first baseband signal intensity and the second baseband signal of the second baseband signal intensity into the receiver output signal.

DESCRIPTION OF THE PREFERRED EMBODIMENTS

Figure 1:
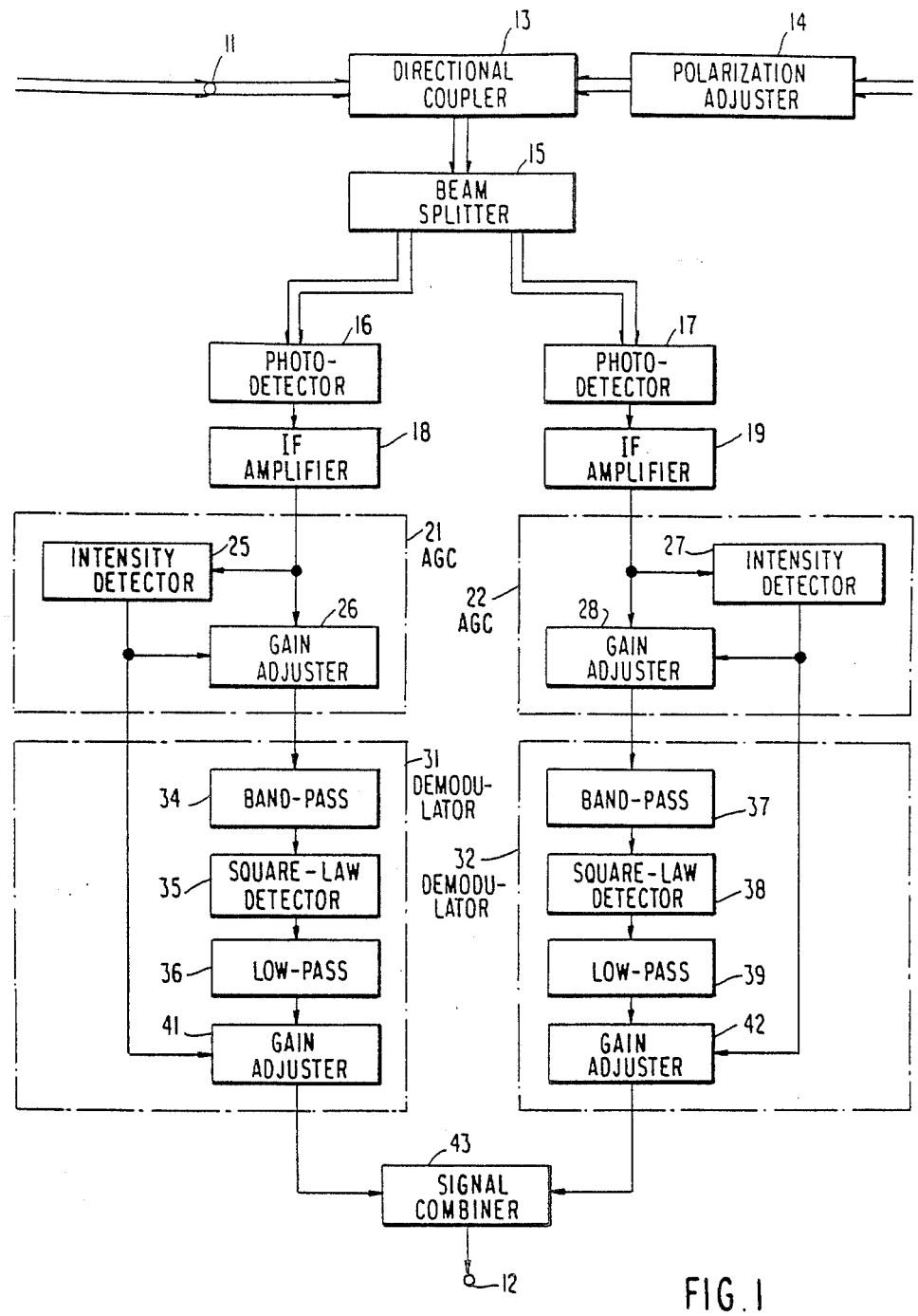
FIG. 1 is a block diagram of a polarization diversity receiver according to a first embodiment of the instant invention.
Figure 2:
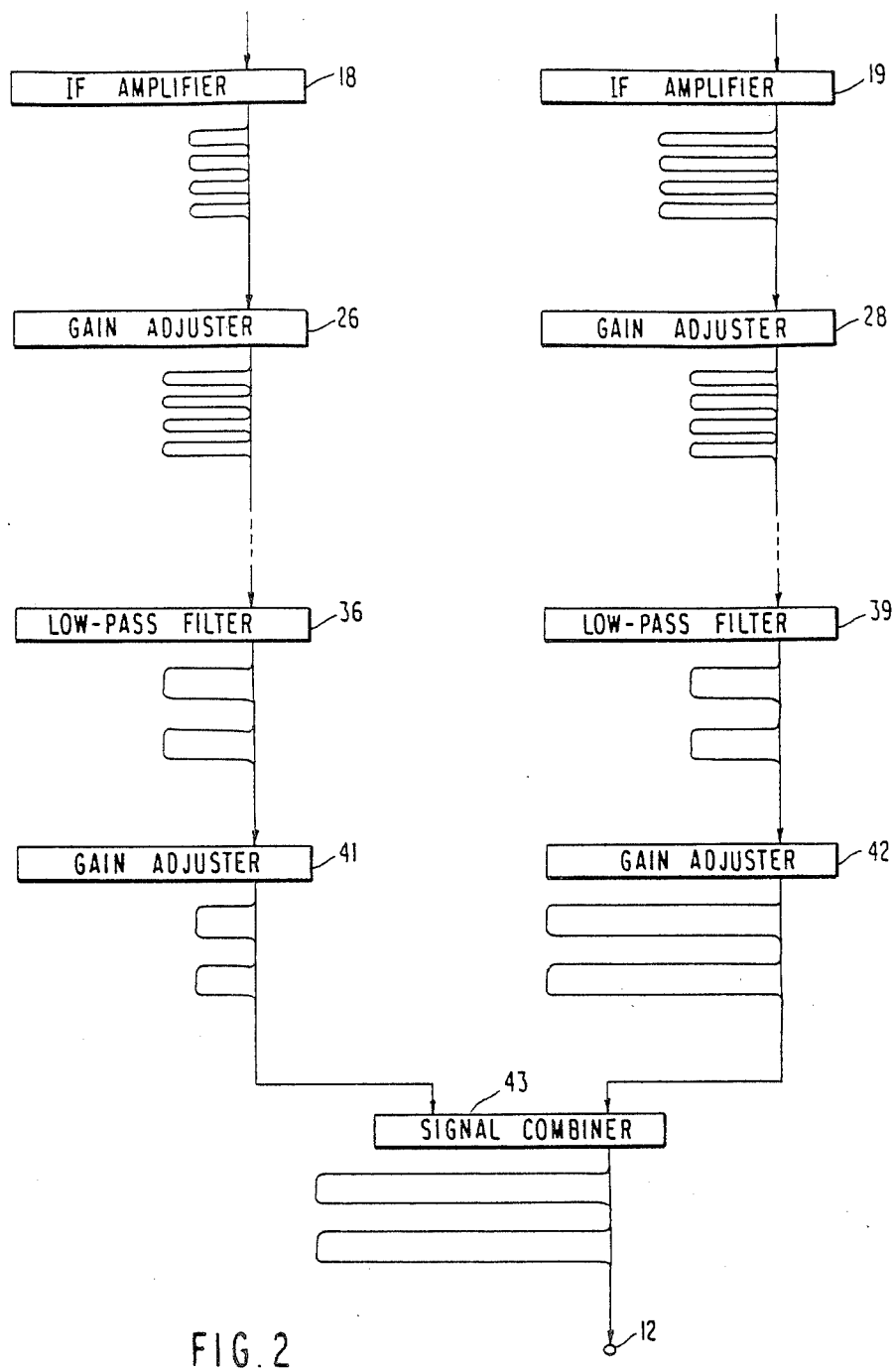
FIG. 2 schematically shows signal amplitudes of signals at various points in the polarization diversity receiver depicted in FIG. 1.

Referring to FIGS. 1 and 2, attention will be directed to a polarization diversity receiver according to a first embodiment of the present invention. The polarization diversity receiver has receiver input and output terminals 11 and 12 and is for heterodyne receiving a signal beam supplied to the receiver input terminal 11 as an incident optical beam through an optical fiber to deliver a receiver output signal to the receiver output terminal 12. It will be assumed merely for convenience of the description that the incident optical beam is subjected to modulation by frequency shift keying (FSK).

In FIG. 1, the incident optical beam is delivered from the receiver input terminal 11 to a directional optical coupler 13, to which a local oscillation beam is supplied from a local optical source (not shown) through a polarization adjuster 14. The optical coupler 13 is for coupling the incident optical beam and the local oscillation beam together to deliver a coupled optical beam to a polarization beam splitter 15 for splitting or dividing the coupled optical beam into first and second optical beams having planes of polarization which are orthogonal to each other. Each of the first and the second optical beams consists of an incident beam component and a local beam component. In the manner known in the art, the polarization adjuster 14 is for giving the local oscillation beam a polarization state such that the local beam components have a common amplitude in the first and the second optical beams.

First and second optical detectors or photodetectors 16 and 17 are for detecting the first and the second optical beams to produce first and second intermediate frequency signals and are accompanied by intermediate frequency (IF) amplifiers 18 and 19 for supplying first and second automatic gain controllers 21 and 22 with first and second amplified intermediate frequency signals which have first and second intermediate frequency signal amplitudes and intensities. When squared, each amplitude is equal to a pertinent one of the intensities.

Inasmuch as supplied to the first automatic gain controller 21 as an input signal, the first amplified intermediate frequency signal will be called a first input intermediate frequency signal. Similarly, the second amplified intermediate frequency signal will be termed a second input intermediate frequency signal.

The first automatic gain controller 21 comprises an intensity detector 25 for detecting a first input intermediate frequency signal intensity of the first input intermediate frequency signal to produce a first control signal. The intensity detector 25 may comprise a diode rectifier (not shown) for converting the amplitude of the first input intermediate frequency signal to a direct-current level to produce the first control signal with the direct-current level. The first input intermediate frequency signal is delivered furthermore to a variable gain amplifier 26, to which the first control signal is feed forward supplied from the first intensity detector 25. Gain adjusting the first input intermediate frequency signal, the variable gain amplifier 26 produces a first output intermediate frequency signal with a first optimum intensity which will presently be described. The variable gain amplifier 26 may alternatively be called a first variable gain adjuster.

The second automatic gain controller 22 likewise comprises an intensity detector 27 for detecting a second input intermediate frequency signal intensity of the second input intermediate frequency signal to produce a second control signal. A variable gain amplifier 28 is supplied with the second input intermediate frequency signal and feed forward controlled by the second control signal to produce a second output intermediate frequency signal with a second optimum intensity which will shortly be described. The variable gain amplifier 28 may be called a second variable gain adjuster.

The first and the second output intermediate frequency signals are delivered to first and second demodulator circuits 31 and 32, each being a square-law demodulator circuit. The first and the second demodulator circuits 31 and 32 need not have a wide dynamic range but a restricted or limited dynamic range. In the example being illustrated, each demodulator circuit 31 or 32 is a frequency shift keying single filter envelope detector circuit. In any event, the first and the second demodulator circuits 31 and 32 should be supplied with the first and the second output intermediate frequency signals with optimum amplitudes which may be either equal to each other or different from each other depending on the characteristics of their respective circuit elements. The variable gain amplifiers 26 and 28 of the first and the second automatic gain controllers 21 and 22 are therefore designed so as to give the first and the second optimum intensities to the first and the second output intermediate frequency signals in consideration of ratings of the first and the second demodulator circuits 31 and 32. This makes the demodulator circuits 31 and 32 optimally operable even when the incident optical beam is subjected to an irregular fluctuation in its polarization state.

The first demodulator circuit 31 comprises a band-pass filter 34 supplied with the first output intermediate frequency signal with the first optimum intensity to produce only mark components of the first output intermediate frequency signal as a first filter output signal. A square-law detector 35 is for converting the first filter output signal to a first detector output signal. Like a differential phase shift keying (DPSK) detector which will later be described, the square-law detector 35 may comprise a signal divider for dividing the first filter output signal into two signal parts and a double balanced mixer for multiplying one of the two signal parts on the other to produce a squared output as the first detector output signal substantially with the first optimum intensity. Supplied with the first detector output signal, a low-pass filter 36 produces a first baseband signal with an intensity which is not different substantially from the first optimum intensity.

Likewise, the second demodulator circuit 32 comprises a band-pass filter 37, a square-law detector 38, and a low-pass filter 39. Supplied with the second output intermediate frequency signal of the second optimum intensity, a combination of the filter 37, the detector 38, and the filter 39 produces a second baseband signal with an intensity which is substantially equal to the second optimum intensity.

The first and the second demodulator circuits 31 and 32 further comprise variable gain amplifiers 41 and 42, which may be named third and fourth variable gain adjusters. Supplied with the first baseband signal of the substantially first optimum intensity from the low-pass filter 36 and with the first control signal from the intensity detector 25 of the first automatic gain controller 21, the third variable gain adjuster 41 gain adjusts the first optimum intensity to a first baseband signal amplitude or intensity. In a like manner, the fourth variable gain adjuster 42 is supplied with the second baseband signal with the substantially second optimum intensity and is controlled by the second control signal to gain adjust the second optimum intensity to a second baseband signal intensity or amplitude. A signal combiner 43 is for combining the first and the second baseband signals of the first and the second baseband signal intensities into the receiver output signal to deliver the receiver output signal to the receiver output terminal 12.

Although not depicted in detail, each of the third and the fourth variable gain adjusters 41 and 42 may comprise a field effect transistor (FET) having a gate electrode which is supplied with a relevent one of the first and the second control signals from the intensity detectors 25 and 27 as a bias voltage. The field effect transistor has a gain controlled by its bias voltage. In the third and the fourth variable gain adjusters 41 and 42, use is made of a bias voltage range in which the gain of each field effect transistor varies in accordance with a square law. With this, the first and the second baseband signal intensities are adjusted to have a ratio which is equal to a square of a ratio between the first and the second input intermediate frequency signal intensities.

In FIG. 2, various points of the polarization diversity receiver are depicted successively vertically. Such points are the intermediate frequency (IF) amplifiers 18 and 19 accompanying the first and the second optical detectors 16 and 17, the first and the second variable gain adjusters 26 and 28, the low-pass filters 36 and 39 of the first and the second demodulator circuits 31 and 32, the third and the fourth variable gain adjusters 41 and 42, and the signal combiner 43. The amplitudes are exemplified horizontally with respect to the signals produced at the various points at a time. In the manner described before, each signal has an intensity which is equal to a square of its amplitude.

It will be assumed that the first and the second input intermediate frequency signals have intensities of an intensity ratio which is equal to one to four at a certain instant of time. The intensity ratio depends on an instantaneous state of polarization of the incident optical beam. It will furthermore be assumed merely for simplicity of the description that the first and the second optimum intensities are equal to a common optimum intensity. The first and the second output intermediate frequency signals are given the common optimum intensity. When supplied to the third and the fourth variable gain adjusters 41 and 42, the first and the second baseband signals have intensities which are substantially equal to the common optimum intensity. The third variable gain adjuster 41 gain adjusts the optimum intensity of the first baseband signal to the first baseband signal intensity. The optimum intensity of the second baseband signal is gain adjusted to the second baseband signal intensity.

In connection with a polarization diversity receiver of the baseband combining type, it has been confirmed that the first and the second baseband signal intensities should be proportional to the squares of the first and the second input intermediate frequency signal intensities in order that the receiver should have a reception sensitivity which is deteriorated possible by the polarization diversity of the baseband combining type the least. Inasmuch as the first and the second input intermediate frequency signals have an intensity ratio of one to four, the first and the second baseband signals are gain adjusted to have an intensity ratio of one to sixteen, namely, an amplitude ratio which is equal to one to four.

Reviewing FIGS. 1 and 2, it is now understood as regards the polarization diversity receiver being illustrated that the first and the second output intermediate frequency signals are supplied to the first and the second demodulator circuits 31 and 32 with their respective optimum intensities. This keeps the demodulator circuits 31 and 32 optimally in operation irrespective of the polarization state of the incident optical beam and despite their restricted dynamic ranges and their circuit elements which may have different characteristics. Furthermore, the first and the second baseband signals are gain adjusted to their respective intensities. This makes the polarization diversity least deteriorate the reception sensitivity of the polarization diversity receiver the least. In fact, it has been experimentally confirmed in connection with the polarization diversity receiver put in operation at a bit rate of 400 Mbits per second that a deterioration in the reception sensitivity is only about 0.6 dB and that the reception sensitivity is maintained substantially constant irrespective of the polarization state of the incident optical beam.

Figure 3:
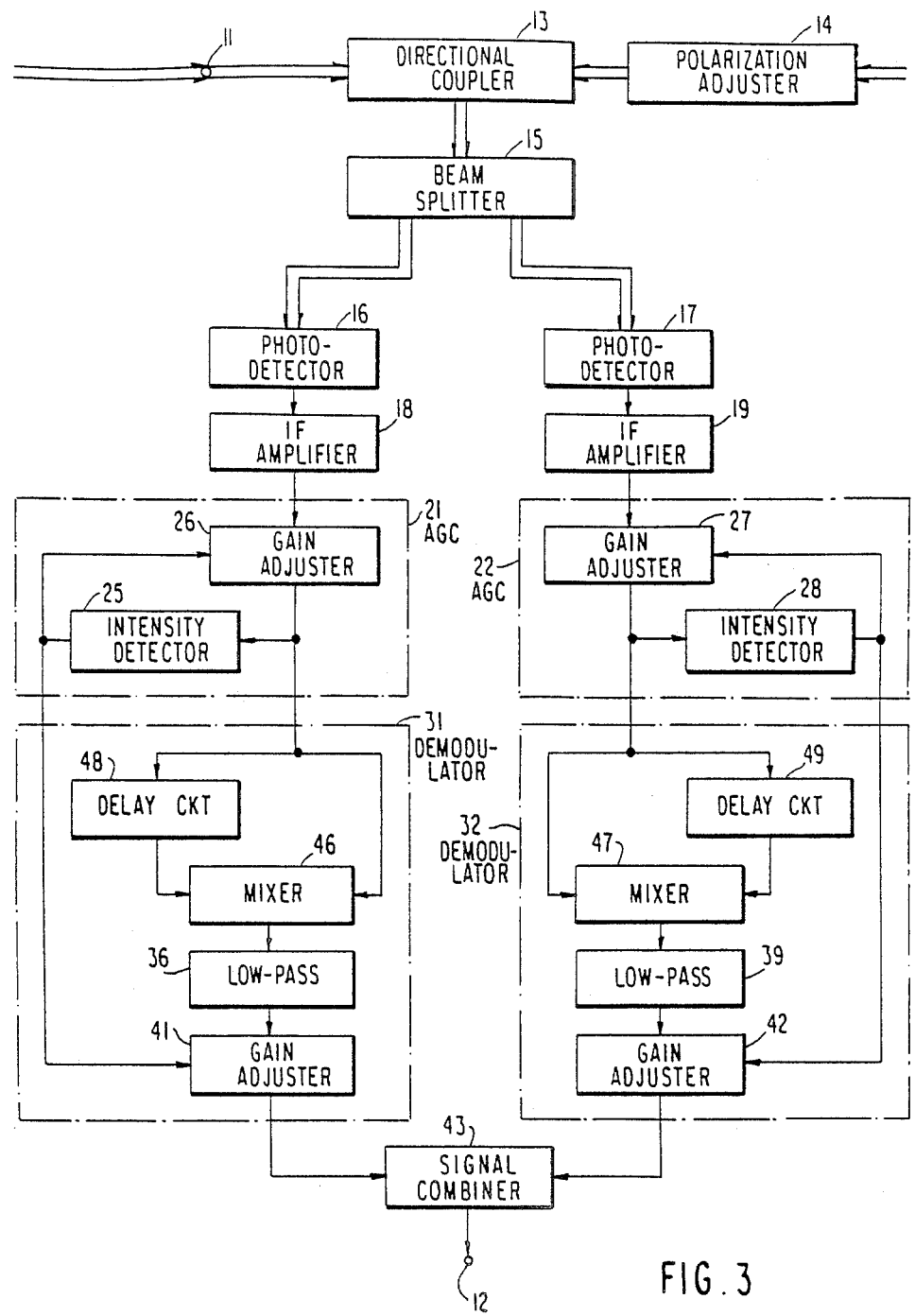
FIG. 3 is a block diagram of a polarization diversity receiver according to a second embodiment of this invention.

Referring now to FIG. 3, the description will proceed to a polarization diversity receiver according to a second embodiment of this invention. In FIG. 3, the polarization diversity receiver has receiver input and output terminals which are not different from those described in conjunction with FIG. 1 and are designated by the reference numerals 11 and 12. Similar parts are designated by like reference numerals and are operable with corresponding signals which are likewise named.

In the first automatic gain controller 21, the intensity detector 25 is not supplied with the first input intermediate frequency signal but with the first output intermediate frequency signal. It will be said for the time being that the first output intermediate frequency signal has a first output intermediate frequency signal intensity. Detecting the first output intermediate frequency signal intensity, the intensity detector 25 produces the first control signal with a level which depends on a difference between the first output intermediate frequency signal intensity and the first optimum intensity.

The first variable gain adjuster 26 is supplied with the first input intermediate frequency signal of the first input intermediate frequency signal intensity from the intermediate frequency (IF) amplifier 18 accompanying the first optical detector 16 and is supplied with the first control signal from the intensity detector 25. The first variable gain adjuster 26 thereby gain adjusts the first output intermediate frequency signal intensity to the first optimum intensity. Being feedback controlled by the first control signal of the above-described level, the first output intermediate frequency signal intensity converges automatically to the first optimum intensity.

In the second automatic gain controller 22, the intensity detector 27 and the second variable gain adjuster 28 are operable in a similar manner. The second output intermediate frequency signal will be said to have a second output intermediate frequency signal intensity. Supplied with the second output intermediate frequency signal from the second variable gain adjuster 28, the intensity detector 27 produces the second control signal with a level which depends on a difference between the second output intermediate frequency signal intensity and the second optimum intensity. The second variable gain adjuster 28 is feedback controlled by the second control signal and gain adjusts the second output intermediate frequency signal intensity automatically to the second optimum intensity.

In FIG. 3, each of the first and the second demodulator circuits 31 and 32 is for carrying out the delay detection in accordance with differential phase shift keying detection. In the manner described in connection with FIG. 1, the first and the second demodulator circuits 31 and 32 comprise the low-pass filters 36 and 39 and the third and the fourth variable gain adjusters 41 and 42.

In order to carry out the differential phase shift keying detection, the first demodulator circuit 31 comprises a first double balanced mixer 46. The second demodulator circuit 32 comprises a second double balanced mixer 47. Like the detectors 35 and 38 described in conjunction with FIG. 1, the double balanced mixers 46 and 47 supply the low-pass filters 36 and 39 with first and second mixer output signals which correspond to the first and the second detector output signals described before and have intensities substantially equal to the first and the second optimum intensities.

After the first output intermediate frequency signal is divided in the first demodulator circuit 31 into two signal parts, one of the signal parts is supplied directly to the first double balanced mixer 46. The other signal part is given by a delay circuit 48 with a delay of one time slot and then supplied to the first double balanced mixer 46, which produces the first mixer output signal.

In the second demodulator circuit 32, the second output intermediate frequency signal is divided into two signal parts. One of the signal parts is supplied directly to the second double balanced mixer 47. The other signal part is supplied to the second double balanced mixer 47, after given a delay of one time slot by a delay circuit 49. The second double balanced mixer 47 produces the second mixer output signal.

Like in the polarization diversity receiver described with reference to FIGS. 1 and 2, the third and the fourth variable gain adjusters 41 and 42 are used in dealing with the first and the second baseband signals. It has been confirmed in connection with the polarization diversity receiver illustrated with reference to FIG. 3 that the reception sensitivity is kept excellent despite a restricted dynamic range of the demodulator circuits 31 and 32 and irrespective of the polarization state of the incident optical beam.

While this invention has thus far been described in specific conjunction with only two preferred embodiments thereof, it will now be readily possible for one skilled in the art to adapt this invention to various other situations and to carry this invention into effect in various other manners. For example, each of the first and the second demodulator circuits 31 and 32 may carry out frequency shift keying dual filter envelope detection, amplitude shift keying (ASK) envelope detection, or continuous phase frequency shift keying (CPFSK) delay detection. If desired, each of the intensity detectors 25 and 27 may produce a pair of control signals, one for the first or the second variable gain adjuster 26 or 28 and the other for the third or the fourth variable gain adjuster 41 or 42. When produced by the intensity detector 25 of the first automatic gain controller 21, such a pair of control signals may collectively be called a first control signal. Similarly, the two control signals may collectively be called a second control signal when produced in pair by the intensity detector 27 of the second automatic gain controller 22. The directional optical coupler 13, the polarization beam splitter 15, and the first and the second optical detectors 16 and 17 may collectively be modified into a combination of the coupling and splitting arrangement and the optical detecting arrangement in accordance with the balanced receiver structure. Incidentally, the excellent operation of the polarization diversity receiver of FIG. 3 was confirmed at a 1.2-GHz bit rate.

What is claimed is:

1. In a polarization diversity receiver comprising coupling and splitting means for coupling and splitting an incident optical beam and a local oscillation beam to produce first and second optical beams including incident optical beam components having orthogonal planes of polarization, optical detecting means for detecting said first and said second optical beams to produce first and second intermediate frequency signals, first and second demodulator circuits, supplying means for supplying said first and said second intermediate frequency signals to said first and said second demodulator circuits to make said first and said second demodulator circuits produce first and second baseband signals, respectively, and a signal combiner for combining said first and said second baseband signals into a receiver output signal, the improvement wherein:

said supplying means comprises:

first and second intensity detectors supplied with said first and said second intermediate frequency signals to detect intensities of said first and said second intermediate frequency signals and to produce first and second control signals, respectively;

a first variable gain adjuster connected to said first intensity detector for gain adjusting said first intermediate frequency signal in response to said first control signal to make said first intermediate frequency signal have a first optimum intensity; and a second variable gain adjuster connected to said second intensity detector for gain adjusting said second intermediate frequency signal in response to said second control signal to make said second intermediate frequency signal have a second optimum intensity;

said first demodulator circuit comprising:

a first demodulator for demodulating the first intermediate frequency signal of said first optimum intensity into said first baseband signal; and a third variable gain adjuster connected to said first intensity detector for gain adjusting said first baseband signal in response to said first control signal to make said first baseband signal have a first adjusted baseband signal intensity;

said second demodulator circuit comprising:

a second demodulator for demodulating said second intermediate frequency signal of said second optimum intensity into said second baseband signal; and a fourth variable gain adjuster connected to said second intensity detector for gain adjusting said second baseband signal in response to said second control signal to make said second baseband signal have a second adjusted baseband signal intensity;

said first and said second baseband signal intensities having a ratio which is equal to a square of a ratio between the intensities of the first and the second intermediate frequency signals supplied to said first and said second variable gain adjusters;

said signal combiner being for combining the first baseband signal of said first baseband signal insenitity and the second baseband signal of said second baseband signal intensity into said receiver output signal.

2. A polarization diversity receiver as claimed in claim 1, wherein:

said first and said second intensity detectors are connected to said optical detecting means to detect the intensities of said first and said second intermediate frequency signals and to produce said first and said second control signals;

said first and said second variable gain adjusters being feed forward controlled by said first and said second control signals, respectively, to make said first and said second intermediate frequency signals have said first and said second optimum intensities, respectively.

3. A polarization diversity receiver as claimed in claim 1, wherein:

said first and said second variable gain adjusters are connected to said optical detecting means to gain adjust said first and said second intermediate frequency signals into first and second output intermediate frequency signals, respectively;

said first and said second intensity detectors being supplied with said first and said second output intermediate frequency signals to detect intensities of said first and said second output intermediate frequency signals to produce said first and said second control signals;

said first and said second variable gain adjusters being feedback controlled by said first and said second control signals, respectively, to make said first and said second output intermediate frequency signal have said first and said second optimum frequencies, respectively.

* * * * *

UNITED STATES PATENT AND TRADEMARK OFFICE
CERTIFICATE OF CORRECTION

PATENT NO. : 4,972,515

DATED : November 20, 1990

INVENTOR(S) : Makoto Shibutani

It is certified that error appears in the above-identified patent and that said Letters Patent is hereby corrected as shown below:

Col. 7, line 51, delete "possible".

Signed and Sealed this

Twenty-eighth Day of July, 1992

Attest:

DOUGLAS B. COMER

*Attesting Officer*  *Acting Commissioner of Patents and Trademarks*